(12) United States Patent
Kaida et al.

(10) Patent No.: US 8,445,058 B2
(45) Date of Patent: May 21, 2013

(54) PROCESS FOR PRODUCING WIRE-GRID POLARIZER

(75) Inventors: Yuriko Kaida, Tokyo (JP); Hiroshi Sakamoto, Tokyo (JP); Takahira Miyagi, Tokyo (JP); Hiromi Sakurai, Tokyo (JP); Yasuhiro Ikeda, Tokyo (JP); Eiji Shidoji, Tokyo (JP); Masako Kawamoto, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 55 days.

(21) Appl. No.: 12/900,272

(22) Filed: Oct. 7, 2010

(65) Prior Publication Data

US 2011/0052802 A1 Mar. 3, 2011

Related U.S. Application Data

(63) Continuation of application No. PCT/JP2009/057076, filed on Apr. 6, 2009.

(30) Foreign Application Priority Data

Apr. 8, 2008 (JP) ................. 2008-100553

(51) Int. Cl.
*B05D 5/06* (2006.01)
(52) U.S. Cl.
USPC ........................................ 427/163.1
(58) Field of Classification Search .................. 427/163.1
See application file for complete search history.

(56) References Cited

U.S. PATENT DOCUMENTS

| 3,235,630 | A | 2/1966 | Doherty et al. |
| 3,291,871 | A | 12/1966 | Francis |
| 3,293,331 | A | 12/1966 | Doherty |
| 4,321,282 | A | 3/1982 | Johnson |
| 4,455,205 | A | 6/1984 | Olson et al. |
| 4,855,333 | A | 8/1989 | Rudik et al. |
| 6,122,103 | A | 9/2000 | Perkins et al. |
| 6,534,235 | B1 | 3/2003 | Hanabata et al. |
| 6,665,119 | B1 | 12/2003 | Kurtz et al. |
| 6,785,050 | B2 | 8/2004 | Lines et al. |
| 6,932,934 | B2 | 8/2005 | Choi et al. |
| 7,026,046 | B2 | 4/2006 | Edlinger et al. |
| 7,074,463 | B2 | 7/2006 | Jones et al. |
| 7,077,992 | B2 | 7/2006 | Sreenivasan et al. |
| 7,158,302 | B2 | 1/2007 | Chiu et al. |
| 7,220,371 | B2 | 5/2007 | Suganuma |

(Continued)

FOREIGN PATENT DOCUMENTS

| CN | 1952700 A | 4/2007 |
| CN | 101080656 | 11/2007 |

(Continued)

OTHER PUBLICATIONS

International Search Report in PCT/JP2009/057076 dated Jul. 14, 2009.

(Continued)

*Primary Examiner* — Elizabeth Burkhart
(74) *Attorney, Agent, or Firm* — Foley & Lardner LLP

(57) ABSTRACT

Provided is a process for easily producing a wire grid polarizer showing a high polarization separation ability in the visible light region and having an improved transmittance in a short wavelength region.

11 Claims, 4 Drawing Sheets

U.S. PATENT DOCUMENTS

| | | | |
|---|---|---|---|
| 7,227,684 | B2 | 6/2007 | Wang et al. |
| 7,309,517 | B2 | 12/2007 | Jones et al. |
| 7,420,005 | B2 | 9/2008 | Hojo et al. |
| 7,639,414 | B2 | 12/2009 | Hwang et al. |
| 7,654,715 | B1 | 2/2010 | Chen et al. |
| 7,692,860 | B2 | 4/2010 | Sato et al. |
| 7,872,803 | B2 | 1/2011 | Uejima et al. |
| 2001/0053023 | A1 | 12/2001 | Kameno et al. |
| 2002/0191286 | A1 | 12/2002 | Gale et al. |
| 2003/0224116 | A1 | 12/2003 | Chen et al. |
| 2004/0239833 | A1 | 12/2004 | Kawazu et al. |
| 2005/0046943 | A1 | 3/2005 | Suganuma |
| 2005/0250052 | A1 | 11/2005 | Nguyen |
| 2006/0119937 | A1 | 6/2006 | Perkins et al. |
| 2006/0215263 | A1 | 9/2006 | Mi et al. |
| 2007/0183025 | A1* | 8/2007 | Asakawa et al. ............. 359/359 |
| 2007/0217008 | A1 | 9/2007 | Wang et al. |
| 2007/0242187 | A1* | 10/2007 | Yamaki et al. ................. 349/96 |
| 2007/0242352 | A1 | 10/2007 | Macmaster |
| 2007/0260008 | A1 | 11/2007 | Saito et al. |
| 2008/0018997 | A1 | 1/2008 | Kawazu et al. |
| 2008/0129931 | A1* | 6/2008 | Takahashi et al. ............. 349/96 |
| 2009/0011367 | A1 | 1/2009 | Omatsu et al. |
| 2009/0052030 | A1 | 2/2009 | Kaida et al. |
| 2010/0038831 | A1 | 2/2010 | Kawaguchi et al. |
| 2010/0103517 | A1 | 4/2010 | Davis et al. |
| 2011/0008577 | A1 | 1/2011 | Miyake et al. |
| 2011/0020617 | A1 | 1/2011 | Kawaguchi |
| 2011/0052802 | A1 | 3/2011 | Kaida et al. |
| 2011/0080640 | A1 | 4/2011 | Kaida et al. |
| 2011/0096396 | A1 | 4/2011 | Kaida et al. |

FOREIGN PATENT DOCUMENTS

| | | | |
|---|---|---|---|
| JP | 58-042003 | A | 3/1983 |
| JP | 60-230102 | A | 11/1985 |
| JP | 61-181809 | | 8/1986 |
| JP | 07-002913 | | 1/1995 |
| JP | 2000-171632 | | 6/2000 |
| JP | 2001-330728 | | 11/2001 |
| JP | 2002-012796 | | 1/2002 |
| JP | 2002-328222 | A | 11/2002 |
| JP | 2004-240297 | | 8/2004 |
| JP | 2005-070456 | | 3/2005 |
| JP | 2005-148506 | | 6/2005 |
| JP | 2006-003447 | | 1/2006 |
| JP | 2006-152074 | | 6/2006 |
| JP | 2008-046637 | | 2/2008 |
| WO | WO-2006/035646 | A1 | 4/2006 |
| WO | WO 2006/064693 | * | 6/2006 |
| WO | WO-2006/064693 | A1 | 6/2006 |
| WO | WO-2008/084856 | A1 | 7/2008 |

OTHER PUBLICATIONS

U.S. Appl. No. 12/659,934, filed Mar. 25, 2010, Kaida, et al.
EP Communication (Supplementary European Search Report) in EP Appln No. 08833490.9 dated Nov. 5, 2010.
Office Action in U.S. Appl. No. 12/659,934 dated Mar. 1, 2011.
International Preliminary Report on Patentability (IPRP) in PCT/JP2009/057076 dated Nov. 30, 2010.
Ahn et al., "Bilayer metal wire-grid polarizer fabricated by roll-to-roll nanoimprint lithography on flexible plastic substrate," J. Vac. Sci. Technol. B, Nov./Dec. 2007, 25(6):2388-2391.
U.S. Appl. No. 12/895,306, filed Sep. 30, 2010, Kaida, et al.
U.S. Appl. No. 12/986,612, filed Jan. 7, 2011, Kaida, et al.
Office Action in CN Appln No. 200980126786.5 dated Apr. 5, 2012.
Non-Final Office Action in U.S. Appl. No. 12/895,306 dated May 9, 2012.
Final Office Action in U.S. Appl. No. 12/986,612 dated May 22, 2012.
Prober, D. et al. "Fabrication of 300-A metal lines with substrate-step techniques", Appl. Phys. Lett., Jul. 1, 1980, vol. 37, No. 1, pp. 94-96.
Office Action in U.S. Appl. No. 12/986,612 dated Jan. 31, 2012.

* cited by examiner

PROCESS FOR PRODUCING WIRE-GRID POLARIZER

TECHNICAL FIELD

The present invention relates to a process for producing a wire-grid polarizer.

BACKGROUND ART

As polarizers (they are also referred to as polarizing separation elements) used for image display devices such as liquid crystal display devices, projection TVs or front projectors, and showing polarization separation ability in the visible light region, there are absorption polarizers and reflection polarizers.

An absorption polarizer is, for example, a polarizer having a dichroic dye such as iodine aligned in a resin film. However, since such an absorption polarizer absorbs one of polarized light, its light-utilization efficiency is low.

On the other hand, in a reflection polarizer, reflected light not incident into the polarizer is incident again into the polarizer, whereby the light-utilization efficiency can be improved. For this reason, a demand for such a reflection polarizer for the purpose of achieving high intensity of e.g. liquid crystal display devices, is increased.

As a reflection polarizer, there are a linear polarizer constituted by a lamination of birefringent resins, a circular polarizer constituted by a cholesteric liquid crystal and a wire-grid polarizer.

However, such a linear polarizer and a circular polarizer have low polarization separation ability. For this reason, a wire-grid polarizer showing high polarization separation ability is attentioned.

A wire-grid polarizer has a construction comprising a light-transmitting substrate having a plurality of parallel fine metallic wires arranged on the substrate. When the pitch of the fine metallic wires is sufficiently shorter than the wavelength of incident light, in the incident light, a component (i.e. p polarized light) having an electric field vector perpendicular to the fine metallic wires is transmitted, but a component (i.e. s polarized light) having an electric field vector parallel with the fine metallic wires is reflected.

As wire-grid polarizers showing polarization separation ability in visible light region, the following types are known.

(1) A wire grid polarizer comprising a light-transmitting substrate on which fine metallic wires are formed at a predetermined pitch (Patent Document 1).

(2) A wire grid polarizer comprising a light-transmitting substrate having a surface on which a plurality of ridges are formed at a predetermined pitch and a top face and side faces of such a ridge is covered with a film of material of metal or a metal compound to form a fine metal wire (Patent Document 2).

However, the wire grid polarizer of (1) is still insufficient in the polarization separation ability.

The wire grid polarizer of (2) has a higher polarization separation ability than the wire grid polarizer of (1). However, the wire grid polarizer of (2) has a problem that it has a low transmittance in a short wavelength region (in the vicinity of 400 nm).

Further, in the process of producing the wire grid polarizer of (2), a metal is vapor-deposited on the top face of each ridge and a bottom face of each groove between the ridges by a single vapor deposition. However, when a metal is vapor-deposited on the top face of each ridge and on a bottom face of each groove between the ridges by a single vapor deposition, it is not easy to avoid vapor-deposition of the metal on side faces of each ridge. Accordingly, the metal tends to be vapor-deposited on side faces of the ridges, and a fine metallic wire on a top face of a ridge tends to continue to a fine metallic wire on a bottom face of a groove between the ridges. When the fine metallic wire on the top face of a ridge and a fine metallic wire on a bottom face of a groove between the ridges form a continuous film, light cannot be transmitted.

PRIOR ART

Patent Documents
  Patent Document 1: JP-A-2005-070456
  Patent Document 2: JP-A-2004-240297
Non-Patent Document
  Non-Patent Document 1: Optics Express, 2006, Vol. 14, No. 6, p. 2323-2334

DISCLOSURE OF THE INVENTION

Problems to be Solved by the Invention

The present invention provides a process for easily producing a wire grid polarizer having a high polarization separation ability in the visible light region and having an improved transmittance in a short wavelength region.

Means for Solvent the Problems

The process for producing a wire grid polarizer of the present invention is a process for producing a wire grid polarizer comprising a light-transmitting substrate having a surface on which a plurality of ridges are formed in parallel with one another at a predetermined pitch; an underlayer covering a top face of each ridge of the substrate and upper end portions of two side faces extending in the longitudinal direction of the ridge, that are a first side face and a second side face; a first fine metallic wire made of a metal or a metal compound and formed on a top face of the underlayer; and a second fine metallic wire made of a metal or a metal compound and formed on a bottom face of a groove between the ridges;

which process comprises forming the underlayer, the first fine metallic wire and the second fine metallic wire by a vapor deposition method satisfying the following conditions (A) to (F):

(A) the under layer material is vapor-deposited at least once on the top face and the first side face of each ridge from a direction substantially perpendicular to the longitudinal direction of the ridge and at an angle of $\theta^L$ on the first side face side to the height direction of the ridge;

(B) the underlayer material is vapor-deposited at least once on the top face of the underlayer formed under the above condition (A) and on the second side face of each ridge from a direction substantially perpendicular to the longitudinal direction of the ridge and at an angle of $\theta^R$ on the second side face side to the height direction of the ridge;

(C) the angle $\theta^L$ in the vapor deposition under the above condition (A) satisfies the following formula (I) and the angle $\theta^R$ in the vapor deposition under the above condition (B) satisfies the following formula (II):

$$60° \leq \theta^L < 90° \quad \text{(I), and}$$

$$60° \leq \theta^R < 90° \quad \text{(II);}$$

(D) the height Hma1 of the underlayer formed by the vapor deposition under the above condition (A) and the vapor deposition under the above condition (B), satisfies the following formula (III):

$$1\ \text{nm} \leq \text{Hma1} \leq 20\ \text{nm} \quad \text{(III);}$$

(E) after the vapor deposition under the above condition (A) and the vapor deposition under the above condition (B) are carried out, a metal or a metal compound is vapor-deposited on the top face of the underlayer and the bottom face of each groove between the ridges;

(F) the height Hma2 of the first fine metallic wire formed by the vapor deposition under the above condition (E) and the height Hp of the ridge satisfy the following formula (IV):

$$40\ nm \leq Hma2 \leq 0.9 \times Hp \tag{IV}$$

The pitch Pp of the ridges is preferably at most 300 nm.

The ratio (Dp/Pp) of the width Dp of the ridge to Pp is preferably from 0.1 to 0.6.

Hp is preferably from 30 to 500 nm.

The width Dmb of the second fine metallic wire and the width (Pp−Dp) of the groove between the ridges preferably satisfy the following formula (1-1):

$$0.45 \times (Pp-Dp) \leq Dmb \leq 0.95 \times (Pp-Dp) \tag{1-1}$$

The height Hmb of the second fine metallic wire and Hp preferably satisfy the following formula (2-1):

$$40\ nm \leq Hmb < Hp \tag{2-1}$$

Effects of the Invention

By the process for producing a wire grid polarizer of the present invention, it is possible to easily produce a wire grid polarizer showing a high polarization separation ability in the visible light region and having an improved transmittance in a short wavelength region.

MODE FOR CARRYING OUT THE INVENTION

<Wire Grid Polarizer>

Figure 1:
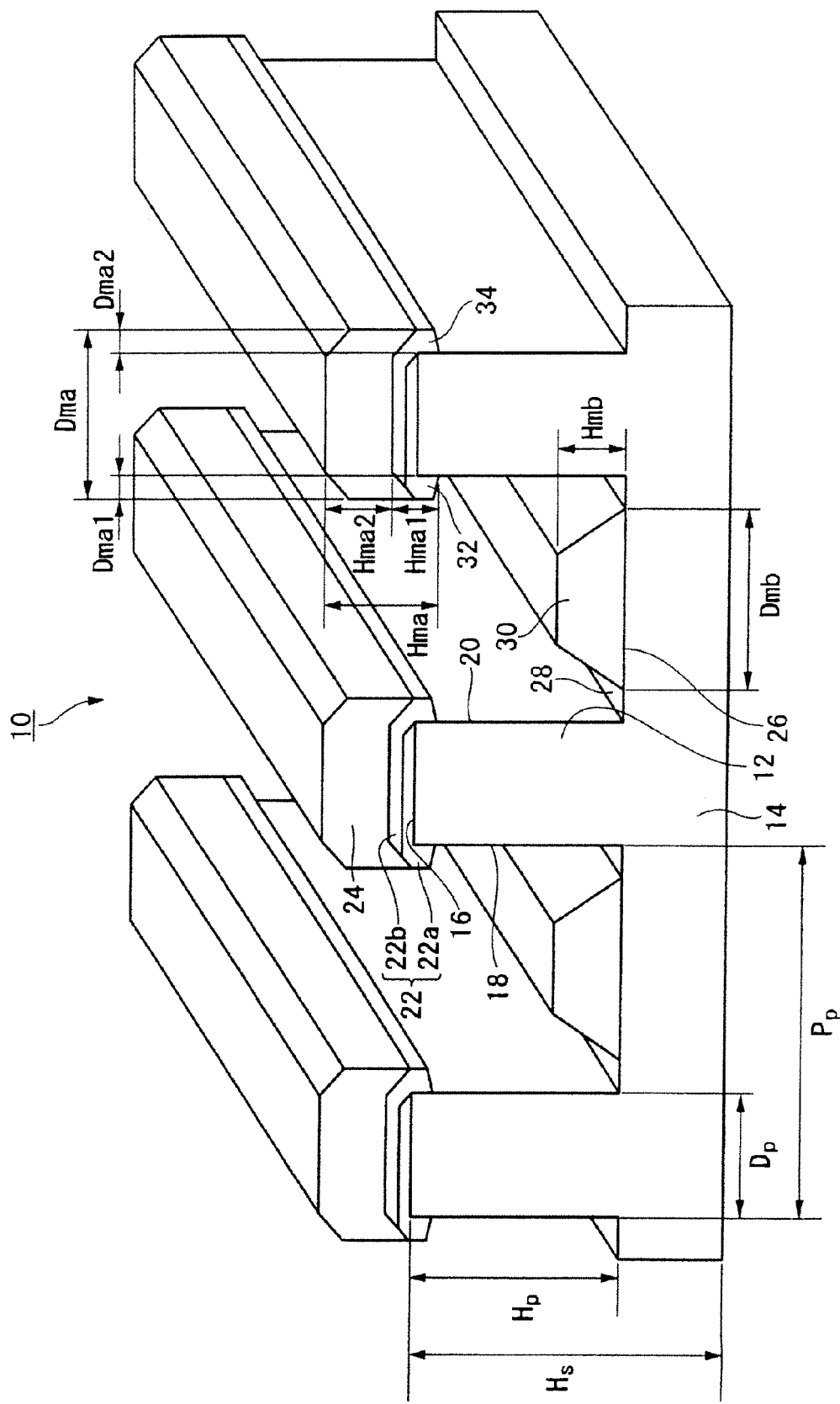
FIG. 1 is a schematic view showing an example of wire grid polarizer of the present invention.

FIG. 1 is a perspective view showing an example of the wire grid polarizer to be produced by the process of the present invention. A wire grid polarizer 10 has a light-transmitting substrate 14 having a surface on which a plurality of ridges 12 are formed so as to be parallel with one another at a predetermined pitch (Pp); an underlayer 22 covering a top face of each ridge 12 and upper end portions of a first side face 18 and a second side face 20 of the ridge 12 extending in the longitudinal direction of the ridge 12; a first fine metallic wire 24 made of a metal or a metal compound and formed on a top face of the underlayer 22; and a second fine metallic wire 30 made of a metal or a metal compound and formed on a bottom face 28 of each groove 26 between the ridges 12.

Pp is the sum of the width Dp of the ridge 12 and the width of a groove 26 formed between the ridges 12. Pp is preferably at most 300 nm, more preferably from 50 to 200 nm. When Pp is at most 300 nm, the wire grid polarizer 10 shows a sufficiently high reflectivity, and even in a short wavelength region of about 400 nm, the wire grid polarizer 10 shows a sufficiently high polarization separation ability. Further, coloring phenomena due to diffraction can be suppressed.

Further, Pp is particularly preferably from 100 to 200 nm, from the viewpoint of easiness of forming the fine metallic wires 22 by vapor deposition.

The ratio between Dp and Pp, that is (Dp/Pp), is preferably from 0.1 to 0.6, more preferably from 0.3 to 0.55, particularly preferably from 0.35 to 0.5. When Dp/Pp is at least 0.1, the wire grid polarizer 10 shows a sufficiently high polarization separation ability. When Dp/Pp is at most 0.6, coloring of transmission light due to interference can be suppressed.

Further, from the viewpoint of easiness of forming the fine metallic wires by vapor deposition, Dp is particularly preferably from 30 to 80 nm.

The height Hp of the ridge 12 is preferably from 30 to 500 nm, more preferably from 40 to 200 nm, particularly preferably from 50 to 120 nm. When Hp is at least 30 nm, selective deposition of the underlayer 22 on a surface of the ridge 12 becomes easy. When Hp is at most 500 nm, incident angle-dependence of the degree of polarization of wire grid polarizer 10 becomes small. Further, from the viewpoint of capability of reducing wavelength-dispersion of transmittance, Hp is particularly preferably from 50 to 120 nm.

(Light-Transmitting Substrate)

The light-transmitting substrate 14 is a substrate having a light-transmittance in a wavelength region to be used for the wire grid polarizer 10. The light-transmitting means a property of transmitting light, and the wavelength region is specifically a region of from 400 nm to 800 nm. The thickness Hs of the light-transmitting substrate 14 is preferably from 0.5 to 1,000 µm, more preferably from 1 to 40 µm.

The raw material or the material of the light-transmitting substrate 14 may, for example, be a photocurable resin, a thermoplastic resin or a glass. It is preferably a photocurable resin or a thermoplastic resin from the viewpoint of capability of forming the ridges 12 by an imprint method to be described later, and it is particularly preferably a photocurable resin from the viewpoint of capability of forming the ridges 12 by a photoimprint method and from the viewpoint of excellence in the thermal resistance and durability.

The photocurable resin is preferably a resin producible by photo-radical polymerization of a photocurable composition from the viewpoint of productivity.

The photocurable composition is preferably one which has a contact angle of at least 90° with water after the composition is photocured to form a cured film. When such a cured film has a contact angle of at least 90° with water, at a time of forming the ridges 12 by a photoimprint method, it is possible to improve a releasing property from a mold, and to achieve a transferring with high accuracy, and to sufficiently exhibit the objective performance of the wire grid polarizer 10 to be obtained.

(Underlayer)

An underlayer 22 is a layer that is a lamination of a plurality of vapor-deposition films made of an underlayer material. When the underlayer 22 is formed by twice of vapor depositions, the underlayer 22 is a lamination of a first underlayer 22a and a second underlayer 22b.

The height Hma1 of the underlayer 22 is from 1 to 20 nm, preferably from 10 to 15 nm. When Hma1 is at least 1 nm, the transmittance of the wire grid polarizer 10 improves. When Hma1 is at most 20 nm, the transmittance of the wire grid polarizer 10 in the short wavelength region improves.

The width Dma1 of a portion of the underlayer 22 projecting outwardly from a first side face 18 of the ridge 12 (hereinafter it is also referred to as a first projecting portion 32), and the width Dma2 of a portion of the underlayer 22 projecting outwardly from a second side face 20 of the ridge 12 (hereinafter it is also referred to as a second projecting portion 34), are each preferably from 5 nm to 20 nm, more preferably from 10 nm to 15 nm. When Dma1 and Dma2 are at least 5 nm, vapor deposition of a metal or a metal compound on the first side face 18 and the second side face 20 of the ridge 12 is suppressed, and the wire grid polarizer 10 shows a sufficiently high transmittance. When Dma1 and Dma2 are at most 20 nm, the width Dmb of the second fine metallic wire 30 formed on a bottom face of a groove 26 becomes wide, whereby the wire grid polarizer 10 shows a sufficiently high polarization separation ability.

The underlayer material may be a metal (such as silver, aluminum, chromium or magnesium), a metal compound (such as TiN, TaN or $TiSi_2$) or a metal oxide (such as $SiO_2$, $Al_2O_3$, $TiO_2$, $ZrO_2$, $SnO_2$), and from the viewpoint that a wire grid polarizer 10 shows a further high transmittance, it is preferably a metal oxide, particularly preferably $Al_2O_3$. The material of the first underlayer 22a and the material of the second underlayer 22b may be the same or different.

(Fine Metallic Wire)

A first fine metallic wire 24 and a second fine metallic wire 30 (hereinafter they may be generally referred to as fine metallic wire) are formed on a top face of the underlayer 22 and a bottom face 28 of each groove, respectively, and they are scarcely formed on the first side face 18 of the second side face 20 of the ridge 12, whereby the first fine metallic wire 24 and the second fine metallic wire 30 are not continuous on the first side face 12 and the second side face 20 of the ridge 12.

The height Hma2 of the first fine metallic wire 24 is preferably from 40 to 100 nm, more preferably from 45 to 60 nm. When Hma2 is at least 40 nm, the wire grid polarizer 10 shows a sufficiently high polarization separation ability. When Hma2 is at most 100 nm, decrease of transmittance of p-polarized light in the short wavelength side due to a ripple is suppressed, whereby wavelength dispersion of light transmitted through the wire grid polarizer 10 becomes small. Namely, the transmittance in the short wavelength side increases.

Hma (sum of Hma1 and Hma2) is preferably from 45 to 120 nm, more preferably from 50 to 75 nm.

The width Dma1 of a portion of the first fine metallic wire 24 projecting outwardly from the first side face 18 of the ridge 12, and the width Dma2 of a portion of the first fine metallic wire 24 projecting outwardly from the second side face 20 of the ridge 12, are each preferably from 5 to 20 nm, more preferably from 10 to 15 nm. When Dma1 and Dma2 are at least 5 nm, vapor deposition of a metal or a metal compound on the first side face 18 and the second side face 20 of the ridge 12 tends to be suppressed, whereby the wire grid polarizer 10 shows a sufficiently a high transmittance. When Dma1 and Dma2 are at most 20 nm, the opening portion of a groove 26 becomes wide, whereby the wire grid polarizer 10 shows a sufficiently high transmittance.

The width Dma of the first fine metallic wire 24 is preferably wider by from 10 to 40 nm than the width Dp of the ridge 12, more preferably wider by from 15 to 30 nm than the width Dp of the ridge 12.

The width Dmb of the second fine metallic wire 30 and the width (Pp−Dp) of the groove 26 preferably satisfy the following formula (1-1), more preferably satisfy the following formula (1-2):

$$0.45\times(Pp-Dp)\leq Dmb\leq 0.95\times(Pp-Dp) \quad (1\text{-}1)$$

$$0.5\times(Pp-Dp)\leq Dmb\leq 0.9\times(Pp-Dp) \quad (1\text{-}2).$$

When Dmb is at least $0.45\times(Pp-Dp)$, by a shielding effect by the second fine metallic wire 30, the wire grid polarizer 10 shows a sufficiently high polarization separation performance. When Dmb is at most $0.95\times(Pp-Dp)$, the transmittance of the wire grid polarizer 10 increases.

The height Hmb of the second fine metallic wire 30 and the height Hp of the ridge 12 preferably satisfy the following formula (2-1), more preferably satisfy the following formula (2-2):

$$40\text{ nm}\leq Hmb<Hp \quad (2\text{-}1), \text{ and}$$

$$45\text{ nm}\leq Hmb\leq 0.8\, Hp \quad (2\text{-}2).$$

Hma and Hmb satisfy a relation $Hmb\leq Hma$.

The dimensions of the ridge 12, the underlayer 22 and the fine metallic wire of the present invention, are each obtained by measuring the maximum value of the dimension at each of five positions in a scanning electron microscopic image or a transmission electron microscopic image of a cross section of the wire grid polarizer 10, and averaging the values of the five positions.

The cross-sectional shape of the fine metallic wire may be a square, a rectangle, a trapezoid, a triangle, a circle, an ellipse or other various shapes. The cross section of the second fine metallic wire 30 is preferably a trapezoid, a rectangle, a circle or a part of circle.

The material of the fine metallic wires may be a metal (silver, aluminum, chromium, magnesium, etc.) or a metal compound (TiN, TaN, $TiSi_2$, etc.). From the viewpoint of high reflectivity for visible light, low absorption for visible light and high electric conductivity, it is preferably silver, aluminum, chromium or magnesium, particularly preferably aluminum.

(Protection Layer)

Since the thickness of the fine metallic wires is extremely small, even a slight scratch of the fine metallic wires adversely affect the performance of the wire grid polarizer 10. Further, there is a case where the electric conductivity of the fine metallic wires 22 is decreased by rust, which deteriorates the performance of the wire grid polarizer 10 in some cases. Accordingly, in order to suppress scratch and rust of the fine metallic wires, the fine metallic wires may be covered with a protection layer.

The protection layer may, for example, be a resin, a metal oxide or a glass. For example, when aluminum is employed as the metal, a surface of the aluminum is oxidized in the air to form an aluminum oxide. Such a metal oxide film functions as a protection layer of the fine metallic wires.

In order to decrease reflection of p-polarized light at an interface between the light-transmitting substrate 14 and the protection layer, the refractive index of the protection layer and the refractive index of the light-transmitting substrate preferably substantially equal to each other.

The protection layer is preferably one having a heat resistance and a visible light transmittance, and from the viewpoint of obtaining a high polarization separation ability in a wide wavelength range, the protection layer is more preferably one having a low refractive index.

Since the protection layer is present at the outermost surface of the wire grid polarizer 10, the protection layer is preferably one having a hardness of at least a pencil hardness of H and preferably has an antipollution property as well.

The protection layer or the light-transmitting substrate 14 may have an antireflective structure on its surface in order to improve the utilization efficiency of light.

The wire grid polarizer 10 described above has a light-transmitting substrate 14 having a surface on which a plurality of ridges 12 are formed in parallel with one another at a predetermined pitch (Pp) and a first fine metallic wire 24 formed on each ridge 12 of the light-transmitting substrate 14 and a second fine metallic wire 30 formed on a bottom face 28 of each groove 26 between the ridges 12, and since the first fine metallic wire 24 does not continue to the second fine metallic wire 30, the wire grid polarizer 10 shows a high polarization separation performance in the visible light region.

Further, the wire grid polarizer 10 has an underlayer 22 covering a top face 16 of each ridge 12 of the light-transmitting substrate 14, and upper end portions of the first side face 18 and the second side face 20 that are two side faces of the ridge 12 extending in the longitudinal direction, and the first fine metallic wire is formed on the top face of the underlayer 22. Accordingly, the wire grid polarizer has an improved transmittance in the short wavelength region as compared with a conventional wire grid polarizer.

<Process for Producing a Wire Grid Polarizer>

The wire grid polarizer 10 is produced by preparing a light-transmitting substrate 14 having a surface on which a plurality of ridges 12 are formed so as to be parallel with one another at a predetermined pitch (Pp), forming an underlayer 22 on a top face 16 of each ridge 12 of the light-transmitting substrate 14 and the upper edge portions of a first side face 18 and a second side face 20 that are two side faces of each ridge 12 extending in the longitudinal direction, and simultaneously forming a first fine metallic wire 24 and a second fine metallic wire 24 on the top face of the underlayer 22 and a bottom face 28 of each groove 26 between the ridges 12, respectively.

(Process for Producing Light-Transmitting Substrate)

The process for producing the light-transmitting substrate 14 may, for example, be an imprinting method (photoimprinting method or thermoimprinting method) or a lithography method. From the viewpoint of productivity in forming the ridges 12 and capability of producing a light-transmitting substrate 14 having a large area, the process is preferably an imprinting method, and from the viewpoint of high productivity in producing the ridges 12 and capability of transferring the shape of grooves of a mold with high precision, the process is particularly preferably a photoimprinting method.

The photoimprinting method is, for example, be a method of preparing a mold in which a plurality of grooves are formed in parallel with one another at a predetermined pitch (Pp) by a combination of electron beam lithography and etching, transferring the shape of the grooves of the mold into a photocurable composition applied on a surface of an optional substratum, and photocuring the photocurable composition at the same time.

The preparation of light-transmitting substrate 14 by the photoimprinting method is specifically carried out through the following steps (i) to (v).

(i) A step of applying a photocurable composition on a surface of a substratum.

(ii) A step of pressing a mold in which a plurality of grooves are formed so as to be parallel with one another at a predetermined pitch, against the photocurable composition so that the grooves contact with the photocurable composition.

(iii) A step of radiating a radiation (UV rays, electron beams, etc.) to the photocurable composition in a state that the mold is pressed against the photocurable composition, to cure the photocurable composition to produce a light-transmitting substrate 14 having a plurality of ridges 12 corresponding to the grooves of the mold.

(iv) A step of separating the mold from the light-transmitting substrate 14.

(v) A step of separating the substratum from the light-transmitting substrate 14 as the case requires before or after formation of underlayer 22 and fine metallic wires on the light-transmitting substrate 14.

The preparation of light-transmitting substrate 14 by a thermoimprinting method is specifically carried out through the following steps (i) to (iv).

(i) A step of forming on a surface of a substratum a layer of thermoplastic resin to which a pattern is transferred, or a step of producing a film of thermoplastic resin to which a pattern is transferred.

(ii) A step of pressing a mold in which a plurality of grooves are formed so as to be parallel with one another at a predetermined pitch, against the layer to which a pattern is transferred or the film to which the pattern is transferred, so that the grooves contact with the layer or the film, in a state that they are heated to be at least the glass transition temperature (Tg) or the melting point (Tm) of the thermoplastic resin, to prepare a light-transmitting substrate 14 having a plurality of ridges 12 corresponding to the grooves of the mold.

(iii) A step of cooling the light-transmitting substrate 14 to a temperature lower than Tg or Tm and separating the mold from the light-transmitting substrate 14.

(iv) A step of separating the substratum from the light-transmitting substrate 14 as the case requires before or after formation of underlayer 22 and fine metallic wires on the light-transmitting substrate 14.

(Method for Producing Underlayer)

The underlayer 22 is formed by an oblique vapor deposition method of vapor-depositing an underlayer-forming material from an obliquely upward direction of a surface of the light-transmitting substrate 14 on which the ridges 12 are formed. The vapor deposition method may be a physical vapor deposition method such as a vacuum vapor deposition method, a sputtering method or an ion implanting method.

The underlayer 22 is specifically formed by a vapor deposition method satisfying the following conditions (A) to (D).

Figure 2:
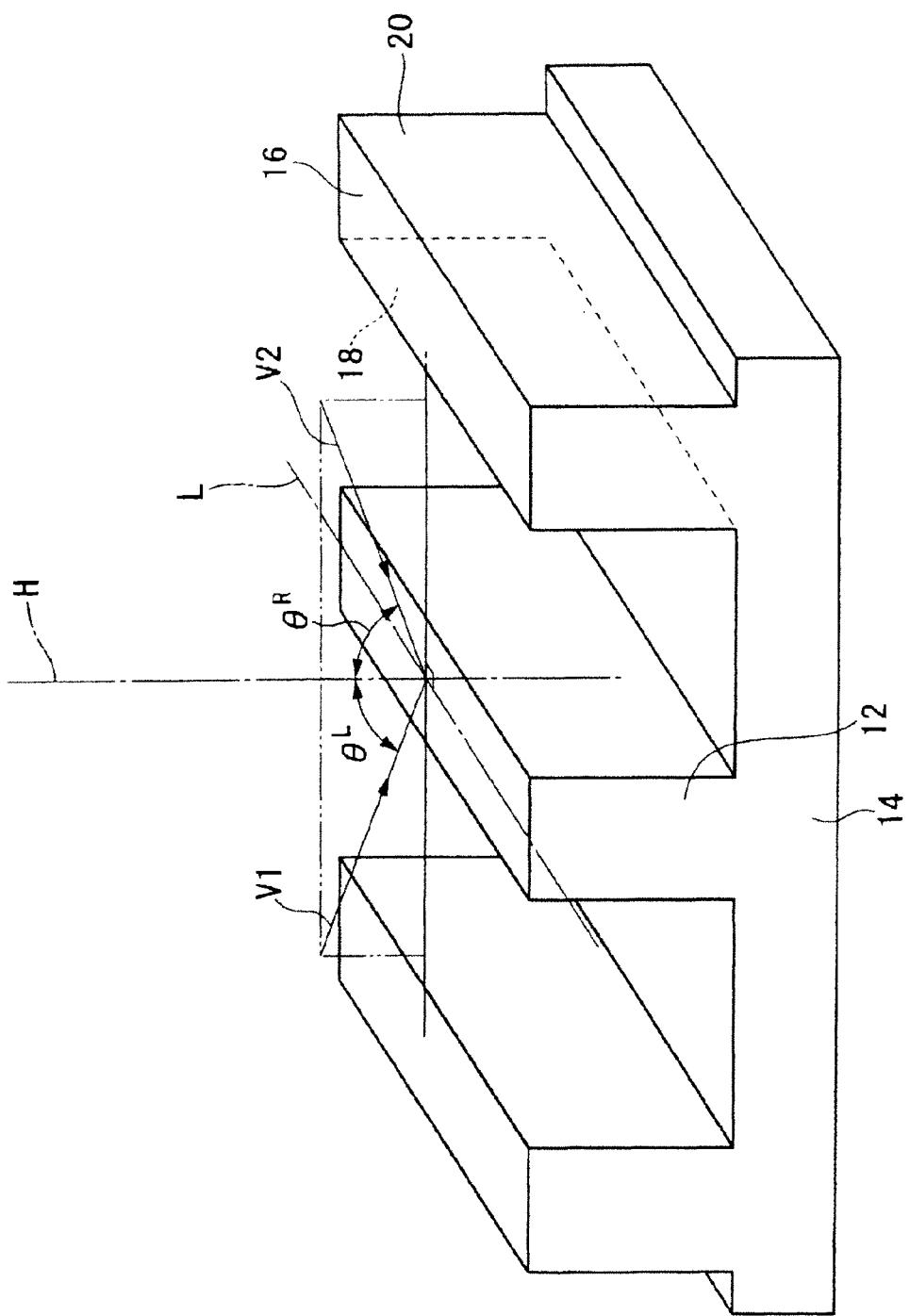
FIG. 2 is a perspective view showing an example of light-transmitting substrate.
Figure 3:
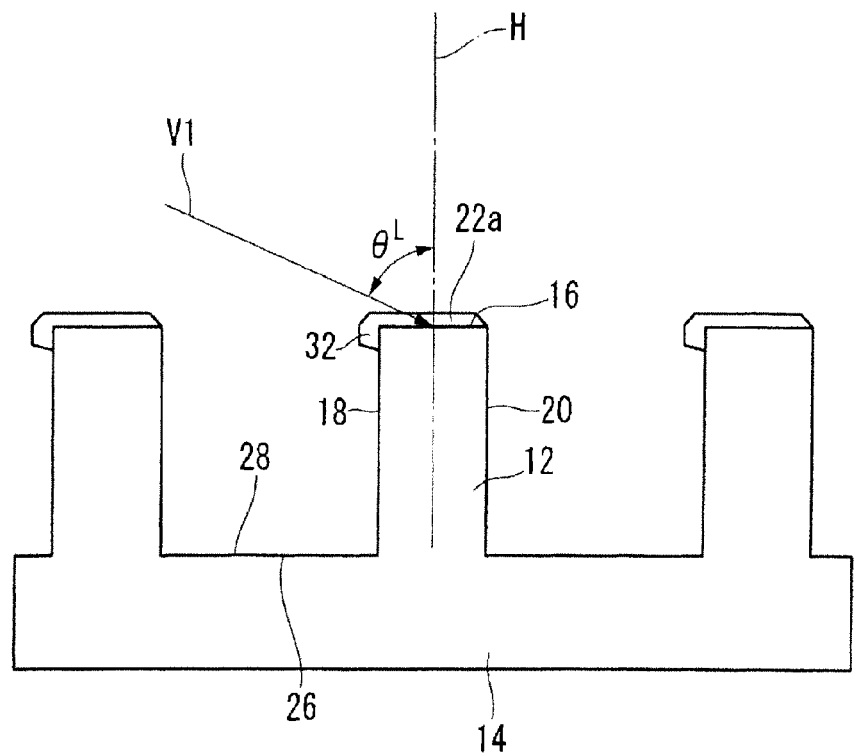
FIG. 3 is a cross-sectional view showing formation of a first underlayer.

(A) An underlayer material is vapor-deposited at least once on the top face and an upper end portion of the first side face 18 of each ridge 12 from a direction V1 substantially perpendicular to the longitudinal direction L of the ridge 12 and at an angle $\theta^L$ on the first side face 18 side to the height direction H of the ridge 12 as shown in FIG. 2, to form a first underlayer 22a as shown in FIG. 3.

Figure 4:
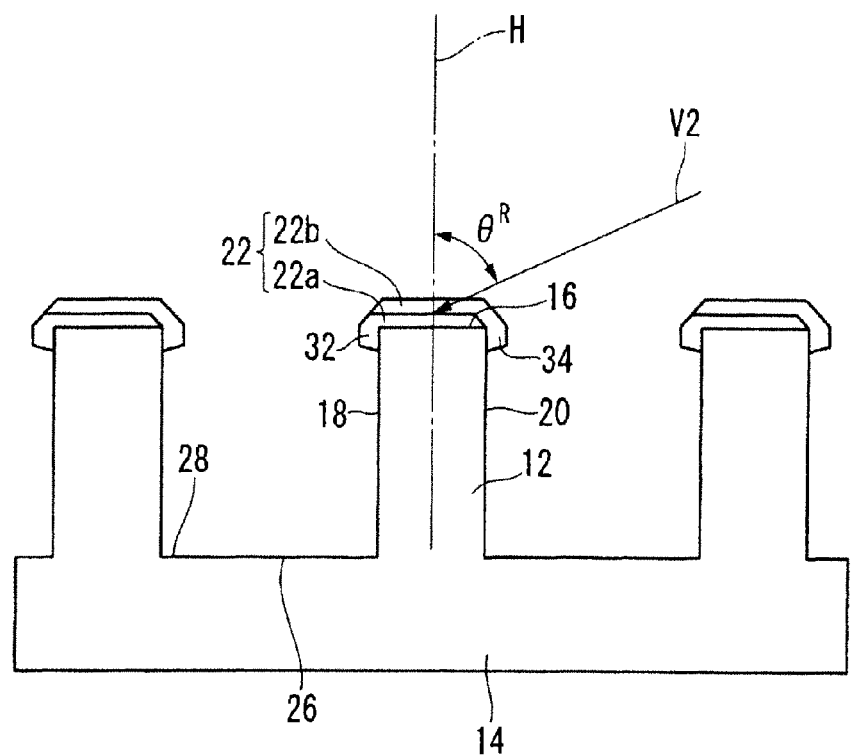
FIG. 4 is a cross-sectional view showing formation of a second underlayer.

(B) The underlayer material is vapor-deposited at least once on the top face of the first underlayer 22a and the upper end portion of the second side face 20 of the ridge 12 from a direction V2 substantially perpendicular to the longitudinal direction L of the ridge 12 and at an angle $\theta^R$ on the second side face 20 side to the height direction H of the ridge 12 as shown in FIG. 2, to form a second underlayer 22b as shown in FIG. 4.

(C) The angle $\theta^L$ in the vapor deposition under the above condition (A) satisfies the following formula (I) and the angle $\theta^R$ in the vapor deposition under the above condition (B) satisfies the following formula (II):

$$60° \leq \theta^L < 90° \qquad \text{(I), and}$$

$$60° \leq \theta^R < 90° \qquad \text{(II)}.$$

(D) The height Hma1 of the underlayer 22 formed by the vapor deposition under the above condition (A) and the vapor deposition under the above condition (B), satisfies the following formula (III):

$$1 \text{ nm} \leq Hma1 \leq 20 \text{ nm} \qquad \text{(III)}.$$

Conditions (A) and (B):

When the conditions (A) and (B) are not satisfied, a first projection portion 32 and a second projecting portion 34 are not formed, and accordingly, at a time of forming fine metallic wires, a metal or a metal compound tends to be vapor-deposited on the first side face 18 and the second side face 20 of each ridge 12. As a result, the first fine metallic wire 24 and the second fine metallic wire 30 become continuous, whereby the transmittance of the wire grid polarizer 10 decreases. Here, in this specification, "substantially perpendicular" means that the angle between the direction L and the direction V1 (or the direction V2) is within a range of from 85 to 95°.

Condition (C):

At a time of carrying out a vapor deposition on ridges 12 having a pitch of at most the wavelength of light, the shape of the underlayer 22 changes according to the angle $\theta^L$ (or $\theta^R$) of the vapor deposition, and accordingly, it is not possible to form an underlayer 22 having a proper shape under some angle $\theta^L$ (or $\theta^R$) conditions. When the angle $\theta^L$ (or $\theta^R$) is less than 60°, the first projecting portion 32 and the second projecting portion 34 are not formed or their widths Dma1 and Dma2 become insufficient or, at a time of forming the first projecting portion 32 and the second projecting portion 34, a metal or a metal compound is vapor-deposited on the first side face 18 or the second side face 20 of each ridge 12 to make the first fine metallic wire 24 and the second fine metallic wire 30 continuous, and as a result, the transmittance of the wire grid polarizer 10 decreases. If the angle $\theta^L$ (or $\theta^R$) is at least 90°, formation of the underlayer 22 is difficult. The angle $\theta^L$ (or $\theta^R$) is preferably at least 70° and at most 85°, particularly preferably at least 75° and at most 80°.

Condition (D):

If Hma1 is less than 1 nm, the first projecting portion 32 and the second projecting portion 34 having a sufficient width for preventing vapor deposition of a metal or a metal compound on the first side face 18 and the second side face 20 of each ridge 12 are not formed, and accordingly, the transmittance of the wire grid polarizer 10 becomes insufficient. A fine metallic wire formed with a large vapor deposition angle $\theta^L$ (or $\theta^R$) shows a high absorption of short wavelength light. When Hma1 exceeds 20 nm, since the thickness of such a fine metallic wire becomes large, the wavelength dispersion of the wire grid polarizer 10 becomes large and its transmittance in the short wavelength side decreases. Hma1 is preferably at least 10 nm and at most 15 nm.

The angle $\theta^L$ (or $\theta^R$) may be adjusted by, for example, using the following vapor deposition apparatus.

A vapor deposition apparatus wherein the tilt of a light-transmitting substrate 14 disposed so as to oppose to a vapor deposition source, is adjustable so that the vapor deposition source is positioned on an extension line in a direction V1 substantially perpendicular to the longitudinal direction L of the ridge 12 and at an angle $\theta^L$ on the first side face 18 side to the height direction H of the ridge 12, or in a direction V2 substantially perpendicular to the longitudinal direction of the ridge 12 and at an angle $\theta^L$ on the second side face 20 side to the height direction H of the ridge 12.

The vapor deposition source may be a metal (silver, aluminum, chromium, magnesium, etc.), a metal compound (TiN, TaN, TiSi$_2$, etc.) or a metal oxide (SiO$_2$, Al$_2$O$_3$, TiO$_2$, ZrO$_2$, SnO$_2$, etc.). From the viewpoint that the wire grid polarizer 10 shows a further high transmittance, it is preferably a metal compound, particularly preferably Al$_2$O$_3$.

(Method for Forming Fine Metallic Wires)

The fine metallic wires are formed by vapor-depositing a metal or a metal compound from the upper direction in a direction substantially perpendicular to a face of the light-transmitting substrate 14 on which the ridges 12 are formed. The vapor deposition method may be a physical vapor deposition method such as a vacuum vapor deposition method, a sputtering method or an ion plating method.

The fine metallic wires are specifically formed by a vapor deposition method satisfying the following conditions (E) and (F).

Figure 5:
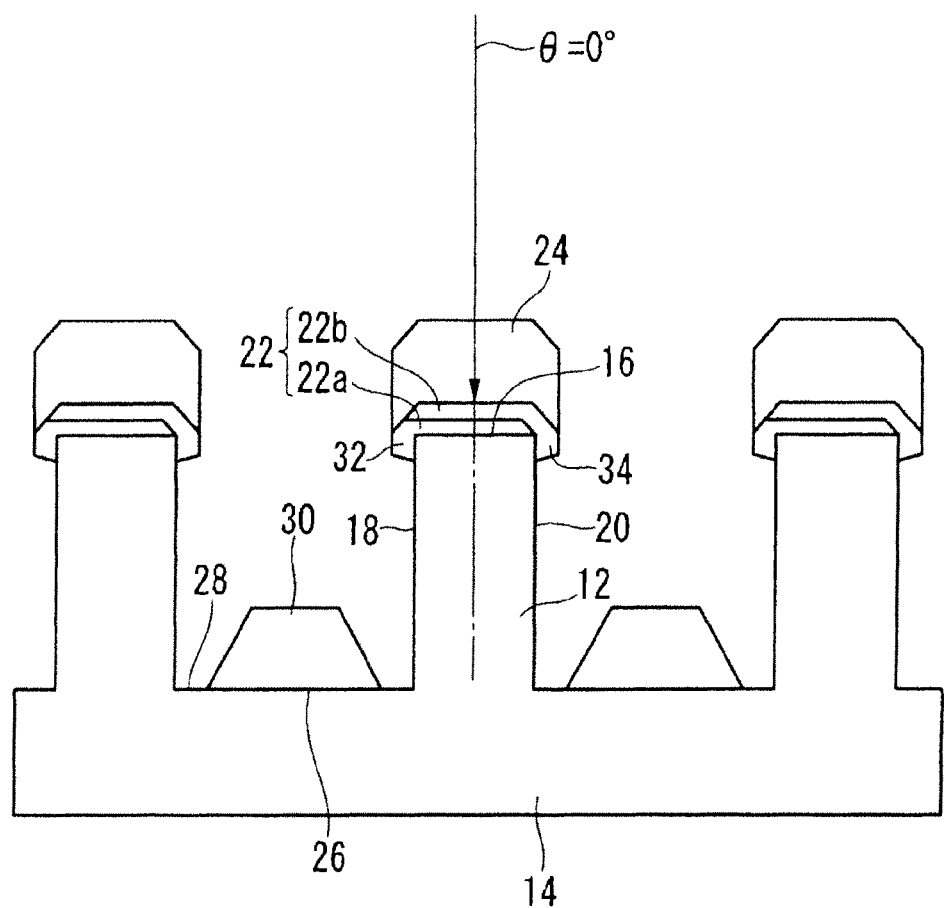
FIG. 5 is a cross-sectional view showing formations of a first fine metallic wire and a second fine metallic wire.

(E) After carrying out a vapor deposition under the above condition (A) and a vapor deposition under the above condition (B), as shown in FIG. 5, a metal or a metal compound is vapor-deposited on a top face of the underlayer 22 and a bottom face 28 of each groove 26 between the ridges 12 from a direction of substantially angle θ=0°.

(F) The height Hma2 of the first fine metallic wire 24 formed by the vapor deposition under the above condition (E) and the height Hp of the ridge 12 satisfy the following formula (IV):

$$40 \text{ nm} \leq Hma2 \leq 0.9 \times Hp \tag{IV}$$

Condition (E):

When the condition (E) is not satisfied, a metal or a metal compound tends to be vapor-deposited on the first side face 18 and the second side face 20 of each ridge 12. As a result, the first fine metallic wire 24 and the second fine metallic wire 30 become continuous, to decrease the transmittance of the wire grid polarizer 10.

Condition (F):

When Hma2 is less than 40 nm, the polarization separation performance of the wire grid polarizer 10 becomes insufficient. When Hma2 exceeds 0.9×Hp, a ripple appears in the short wavelength side of p-polarized light of the wire grid polarizer 10, to decrease the transmittance of the wire grid polarizer 10 in the short wavelength side thereby to increase the wavelength dependence of transmission light.

The vapor deposition source may be a metal (silver, aluminum, chromium, magnesium, etc.) or a metal compound (TiN, TaN, TiSi$_2$, etc.). From the viewpoint of high reflectivity, low absorption of visible light and a high electric conductivity, it is preferably silver, aluminum, chromium or magnesium, particularly preferably aluminum.

In the process for producing a wire grid polarizer 10 described above, the underlayer 22 and the fine metallic wires are formed by a vapor deposition method satisfying the above conditions (A) to (F). Accordingly, it is possible to easily produce a wire grid polarizer 10 having a light-transmitting substrate 14 having a surface on which a plurality of ridges 14 formed so as to be parallel one another at a predetermined pitch (Pp) and a first fine metallic wire 24 formed on each ridge 14 of the light-transmitting substrate 14 and a second fine metallic wire 30 formed on a bottom face of each groove between the ridges 12, wherein the first fine metallic wire 24 and the second fine metallic wire 30 are not continuous.

EXAMPLES

Now, the present invention will be described in further detail with reference to Examples, but the present invention is not limited to these Examples.

Examples 1 to 8 are Examples of the present invention, and Examples 9 to 16 are Comparative Examples.

(Dimensions of Underlayer and Fine Metallic Wire)

Dimensions of underlayer and fine metallic wire are each obtained by measuring the maximum value of the dimension at each of five positions in a transmission electron microscopic image or a scanning electron microscopic image of a cross section of a wire grid polarizer, and averaging the values of the five positions.

(Transmittance)

A solid state laser beam having a wavelength of 405 nm and a semiconductor laser beam having a wavelength of 635 nm are incident from a front surface (a surface on which fine metallic wires are formed) of a wire grid polarizer, so as to perpendicular to the front surface of the wire grid polarizer, to measure the p-polarized light transmittance and the s-polarized light transmittance.

An example which showed a p-polarized light transmittance of at least 70% at a wavelength 400 nm or 70 nm is designated as ○, and an example which showed that of less than 70% is designated as x.

(Reflectivity)

A solid state laser beam having a wavelength of 405 nm and a semiconductor laser beam having a wavelength of 635 nm are incident from a front surface of a wire grid polarizer so as to be at an angle of 5° to the front surface of the wire grid polarizer, to measure the s-polarized light reflectivity.

An example which showed a s-polarized light reflectivity of at least 80% at a wavelength 400 nm or 700 nm is designated as ○, and a sample showing that of less than 80% is designated as x.

(Degree of Polarization)

The degree of polarization was calculated by the following formula.

Degree of polarization=$((Tp-Ts)/(Tp+Ts))\times 100$ wherein Tp is the p-polarized light transmittance, and Ts is the s-polarized light transmittance.

An example which showed a degree of polarization of at least 99.5% is designated as ○, and a sample which showed a degree of polarization of less than 99.5% is designated as x.

(Preparation of Photocurable Composition)

60 g of a monomer 1 (NK ester A-DPH, dipentaerythritol hexaacrylate, manufactured by Shin-Nakamura Chemical Co., Ltd.), 40 g of a monomer 2 (NK ester A-NPG, neopentyl glycol diacrylate, manufactured by Shin-Nakamura Chemical Co., Ltd.), 4.0 g of a photopolymerization initiator (IRGACURE 907, manufactured by Ciba Specialty Chemicals), 0.1 g of a fluorosurfactant (cooligomer of fluoroacrylate ($CH_2$=$CHCOO(CH_2)_2(CF_2)_8F$) and butyl acrylate, manufactured by Asahi Glass Company, Limited, fluorine content: about 30 mass %, mass-average molecular weight: about 3,000), 1.0 g of a polymerization inhibitor (Q1301, manufactured by Wako Pure Chemical Industries, Ltd.) and 65.0 g of cyclohexane, were put in a four-port flask of 1,000 mL to which a stirrer and a cooling pipe are attached.

In a state that inside of the flask was set to room temperature while light is shielded, stirring was carried out for 1 hour to homogenize the content. Subsequently, while the content of the flask was being stirred, 100 g of a colloidal silica (solid state content: 30 g) was gradually added, and the content of the flask was stirred for 1 hour in a state that inside of the flask was set to room temperature while light is shielded, to homogenize the content. Subsequently, 340 g of cyclohexanone was added, and the content of the flask was stirred for 1 hour in a state that inside of the flask was set to room temperature while light is shielded, to obtain a solution of photocurable composition 1.

Example 1

(Preparation of Light-Transmitting Substrate)

The photocurable composition 1 was applied on a surface of a high-transmitting polyethylene terephthalate (PET) film (Teijin Tetron O3, manufactured by Teijin DuPont, 100 mm×100 mm) having a thickness of 100 μm, by a spin coating method, to form a coating film of the photocurable composition 1 having a thickness of 1 μm.

A quartz mold (50 mm×50 mm, groove pitch Pp: 150 nm, groove width Dp: 50 nm, groove depth Hp: 75 nm, groove length: 50 mm, cross-sectional shape of groove: rectangular) having a plurality of grooves formed so as to be parallel with one another at a predetermined pitch, was pressed against the coating film of the photocurable composition 1 at 25° C. with 0.5 MPa (gauge pressure) so that the grooves contact with the coating film of the photocurable composition 1.

While the above state was maintained, light of a high pressure mercury lamp (frequency: 1.5 kHz to 2.0 kHz, peak wavelengths: 255 nm, 315 nm and 365 nm, radiation energy at 365 nm: 1,000 mJ) was radiated to the photocurable composition 1 for 15 seconds from the quartz mold side, to cure the photocurable composition 1 to produce a light-transmitting substrate 1 (ridge pitch Pp: 150 nm, ridge width Dp: 50 nm, ridge height: Hp: 75 nm) having a plurality of ridges corresponding to the grooves of the quartz mold. The quarts mold was slowly separated from the light-transmitting substrate.

(Formation of Underlayer and Fine Metallic Wires)

Employing a vacuum vapor deposition apparatus (SEC-16CM, manufactured by Showa Shinku Co., Ltd.) wherein the tilt of a light-transmitting substrate facing to a vapor deposition source is adjustable, an underlayer-forming material and a metal were vapor-deposited on the ridges of the light-transmitting substrate, to form an underlayer and fine metallic wires, thereby to obtain a wire grid polarizer having a rear surface on which a PET film was pasted. At this time, a vapor deposition from a direction V1 (that is, from a first side face side) substantially perpendicular to the longitudinal direction L of the ridges and at an angle $\theta^L$ on the first side face side to the height direction H of the ridges, a vapor deposition from a direction V2 (that is, from the second side face side) substantially perpendicular to the longitudinal direction L of the ridges and at an angle $\theta^R$ on the second side face side to the height direction H of the ridges, and a vapor deposition from an angle θ=0° are carried out in this order so that the vapor deposition source and the angle $\theta^L$ or the angle $\theta^R$ at each vapor deposition and the thickness Hma of the underlayer or the fine metallic wires formed by each vapor deposition were as shown in Table 1. Here, Hma was measured by a film thickness monitor employing a quartz oscillator as a film thickness sensor.

With respect to a wire grid polarizer obtained, dimensions of the underlayer and the fine metallic wires were measured. Table 2 shows the results.

Further, with respect to the wire grid polarizer obtained, the transmittance, the reflectivity and the degree of polarization were measured. Table 3 shows the results.

Examples 2 to 6

After a light-transmitting substrate was prepared in the same manner as Example 1, a wire grid polarizer was obtained in the same manner as Example 1 except that the number of vapor depositions, the vapor deposition source and the angle $\theta^L$ or the angle $\theta^R$ at each vapor deposition and the thickness Hma' of the underlayer or the fine metallic wires formed by each vapor deposition were the material, the angle and the thickness as shown in Table 1.

With respect to the wire grid polarizer obtained, dimensions of the underlayer and the fine metallic wires were measured. Table 2 shows the results.

Further, with respect to the wire grid polarizer obtained, the transmittance, the reflectivity and the degree of polarization were measured. Table 3 shows the results.

Example 7

(Preparation of Light-Transmitting Substrate)

The photocurable composition 1 was applied on a surface of the PET film by a spin coating method to form a coating film of the photocurable composition 1 having a thickness of 1 µm.

A quartz mold in which a plurality of grooves are formed so as to be parallel one another at a predetermined pitch (50 mm×50 mm, groove pitch Pp: 150 nm, groove width Dp: 50 nm, groove depth Hp: 100 nm, groove length: 50 mm, cross-sectional shape of groove: rectangular) was pressed against the coating film of the photocurable composition 1 at 25° C. with 0.5 MPa (gauge pressure) so that the grooves contact with the coating film of the photocurable composition 1.

While this state was maintained, light of a high pressure mercury lamp (frequency: 1.5 kHz to 2.0 kHz, peak wavelengths: 255 nm, 315 nm and 365 nm, radiation energy at 365 nm: 1,000 mJ) was radiated for 15 seconds from the quartz mold side to cure the photocurable composition 1 to prepare a light-transmitting substrate (ridge pitch Pp: 150 nm, ridge width Dp: 50 nm, ridge height Hp: 100 nm) having a plurality of ridges corresponding to the grooves of the quartz mold. The quartz mold was gradually separated from the light-transmitting substrate.

(Formation of Fine Metallic Wires)

A wire grid polarizer was obtained in the same manner as Example 1 except that the vapor deposition source for each vapor deposition, the angle $\theta^L$ or $\theta^R$ and the thickness Hma' of the fine metallic wires formed by each vapor deposition, were the material, the angle and the thickness as shown in Table 1.

With respect to the wire grid polarizer obtained, dimensions of the fine metallic wires were measured. Table 2 shows the results.

Further, with respect to the wire grid polarizer obtained, the transmittance, the reflectivity, the polarization degree and the angle dependence were measured. Table 3 shows the results.

Example 8

(Preparation of Light-Transmitting Substrate)

The photocurable composition 1 was applied on a surface of the PET film by a spin coating method to form a coating film of the photocurable composition 1 having a thickness of 1 µm.

A quartz mold in which a plurality of grooves are formed so as to be parallel one another at a predetermined pitch (50 mm×50 mm, groove pitch Pp: 120 nm, groove width Dp: 40 nm, groove depth Hp: 60 nm, groove length: 50 mm, cross-sectional shape of groove: rectangular) was pressed against the coating film of the photocurable composition 1 at 25° C. with 0.5 MPa (gauge pressure) so that the grooves contact with the coating film of the photocurable composition 1.

While this state was maintained, light of a high pressure mercury lamp (frequency: 1.5 kHz to 2.0 kHz, peak wavelengths: 255 nm, 315 nm and 365 nm, radiation energy at 365 nm: 1,000 mJ) was radiated for 15 seconds from the quartz mold side to cure the photocurable composition 1 to prepare a light-transmitting substrate (ridge pitch Pp: 120 nm, ridge width Dp: 40 nm, ridge height Hp: 60 nm) having a plurality of ridges corresponding to the grooves of the quartz mold. The quartz mold was gradually separated from the light-transmitting substrate.

(Formation of Fine Metallic Wires)

A wire grid polarizer was obtained in the same manner as Example 1 except that the vapor deposition source for each vapor deposition, the angle $\theta^L$ or $\theta^R$ and the thickness Hma' of the fine metallic wires formed by each vapor deposition, were the material, the angle and the thickness as shown in Table 1.

With respect to the wire grid polarizer obtained, dimensions of the fine metallic wires were measured. Table 2 shows the results.

Further, with respect to the wire grid polarizer obtained, the transmittance, the reflectivity, the polarization degree and the angle dependence were measured. Table 3 shows the results.

Examples 9 to 12

After a light-transmitting substrate was prepared in the same manner as Example 1, a wire grid polarizer was obtained in the same manner as Example 1 except that the number of vapor depositions, the vapor deposition source and the angle $\theta^L$ or the angle $\theta^R$ at each vapor deposition and the thickness Hma of the underlayer or the fine metallic wires formed by each vapor deposition were the material, the angle and the thickness as shown in Table 1.

With respect to the wire grid polarizer obtained, dimensions of the underlayer and the fine metallic wires were measured. Table 2 shows the results.

Further, with respect to the wire grid polarizer obtained, the transmittance, the reflectivity and the degree of polarization were measured. Table 3 shows the results.

Example 13

(Preparation of Light-Transmitting Substrate)

A light-transmitting substrate (ridge pitch Pp: 100 nm, ridge width Dp: 36 nm, ridge height Hp: 94 nm) having a plurality of ridges corresponding to grooves of a quartz mold, was prepared in the same manner as Example 1 except that the quartz mold (20 mm×20 mm, groove pitch Pp: 100 nm, groove width Dp: 36 nm, groove depth Hp: 94 nm, groove length: 10 mm, cross-sectional shape of groove: rectangular) having a plurality of grooves formed so as to be parallel with one another at a predetermined pitch was employed as a mold.

(Formation of Fine Metallic Wires)

A wire grid polarizer was obtained in the same manner as Example 1 except that the vapor deposition source and the angle $\theta^L$ or the angle $\theta^R$ at each vapor deposition and the thickness Hma' of the fine metallic wires formed by each vapor deposition were the material, the angle and the thickness as shown in Table 1.

With respect to the wire grid polarizer obtained, dimensions of the fine metallic wires were measured. Table 2 shows the results.

Further, with respect to the wire grid polarizer obtained, the transmittance, the reflectivity, the degree of polarization and the angle dependence were measured. Table 3 shows the results.

Examples 14 to 16

After a light-transmitting substrate was prepared in the same manner as Example 8, a wire grid polarizer was obtained in the same manner as Example 1 except that the number of vapor depositions, the vapor deposition source and the angle $\theta^L$ or the angle $\theta^R$ at each vapor deposition and the thickness Hma' of the underlayer or the fine metallic wires formed by each vapor deposition were the material, the angle and the thickness as shown in Table 1.

With respect to the wire grid polarizer obtained, dimensions of the underlayer and the fine metallic wires were measured. Table 2 shows the results.

Further, with respect to the wire grid polarizer obtained, the transmittance, the reflectivity and the degree of polarization were measured. Table 3 shows the results.

TABLE 1

| | First vapor deposition (first underlayer) | | | | Second vapor deposition (second underlayer) | | | | Third vapor deposition (fine metallic wire) | | | | Fourth vapor deposition (protection layer) | | | |
|---|---|---|---|---|---|---|---|---|---|---|---|---|---|---|---|---|
| | Material | Direction | $\theta^L$ (°) | Hma' (nm) | Material | Direction | $\Theta^R$ (°) | Hma' (nm) | Material | $\theta$ (°) | Hma' (nm) | | Material | $\theta$ (°) | Hma' (nm) | |
| Ex. 1 | Al | V1 | 75 | 5 | Al | V2 | 75 | 5 | Al | 0 | 45 | | — | — | — | |
| Ex. 2 | Al | V1 | 80 | 5 | Al | V2 | 80 | 5 | Al | 0 | 40 | | — | — | — | |
| Ex. 3 | $Al_2O_3$ | V1 | 75 | 5 | $Al_2O_3$ | V2 | 75 | 5 | Al | 0 | 45 | | — | — | — | |
| Ex. 4 | Al | V1 | 75 | 5 | Al | V2 | 75 | 5 | Al | 0 | 40 | | $SiO_2$ | 0 | 5 | |
| Ex. 5 | Al | V1 | 75 | 9 | Al | V2 | 75 | 9 | Al | 0 | 42 | | — | — | — | |
| Ex. 6 | Al | V1 | 60 | 5 | Al | V2 | 60 | 5 | Al | 0 | 65 | | — | — | — | |
| Ex. 7 | Al | V1 | 80 | 2 | Al | V2 | 75 | 2 | Al | 0 | 40 | | — | — | — | |
| Ex. 8 | Al | V1 | 70 | 3 | Al | V2 | 70 | 3 | Al | 0 | 69 | | — | — | — | |
| Ex. 9 | Al | V1 | 55 | 10 | Al | V2 | 55 | 10 | Al | 0 | 40 | | — | — | — | |
| Ex. 10 | $Al_2O_3$ | V1 | 75 | 20 | $Al_2O_3$ | V2 | 75 | 20 | Al | 0 | 45 | | — | — | — | |
| Ex. 11 | Al | V1 | 75 | 25 | Al | V2 | 75 | 25 | Al | 0 | 45 | | — | — | — | |
| Ex. 12 | $Al_2O_3$ | V1 | 75 | 5 | $Al_2O_3$ | V2 | 75 | 5 | Al | 0 | 70 | | — | — | — | |
| Ex. 13 | — | V1 | — | — | — | V2 | — | — | Al | 0 | 60 | | — | — | — | |
| Ex. 14 | Al | V1 | 45 | 3 | Al | V2 | 45 | 3 | Al | 0 | 33 | | — | — | — | |
| Ex. 15 | Al | V1 | 75 | 12 | Al | V2 | 75 | 12 | Al | 0 | 30 | | — | — | — | |
| Ex. 16 | Al | V1 | 75 | 3 | Al | V2 | 75 | 3 | Al | 0 | 55 | | — | — | — | |

TABLE 2

| (nm) | Dma1 | Dma2 | Dmb | Hma | Hma1 | Hma2 | Hmb | Pb | Dp | Hp |
|---|---|---|---|---|---|---|---|---|---|---|
| Example 1 | 10 | 10 | 80 | 55 | 10 | 45 | 45 | 150 | 50 | 75 |
| Example 2 | 15 | 15 | 70 | 50 | 10 | 40 | 40 | 150 | 50 | 75 |
| Example 3 | 10 | 10 | 80 | 55 | 10 | 45 | 45 | 150 | 50 | 75 |
| Example 4 | 10 | 10 | 80 | 50 | 10 | 40 | 40 | 150 | 50 | 75 |
| Example 5 | 18 | 18 | 64 | 60 | 18 | 42 | 42 | 150 | 50 | 75 |
| Example 6 | 8 | 8 | 84 | 75 | 10 | 65 | 65 | 150 | 50 | 75 |
| Example 7 | 6 | 6 | 88 | 44 | 4 | 40 | 40 | 150 | 50 | 100 |
| Example 8 | 5 | 5 | 70 | 56 | 6 | 50 | 50 | 120 | 40 | 60 |
| Example 9 | — | — | — | — | — | — | — | 150 | 50 | 75 |
| Example 10 | 20 | 20 | 60 | 85 | 40 | 45 | 45 | 150 | 50 | 75 |
| Example 11 | 35 | 35 | 30 | 95 | 50 | 45 | 45 | 150 | 50 | 75 |
| Example 12 | — | — | — | — | — | — | — | 150 | 50 | 75 |
| Example 13 | 18 | 18 | 62 | 60 | 0 | 60 | 60 | 100 | 36 | 94 |
| Example 14 | 4 | 4 | 72 | 39 | 6 | 33 | 33 | 120 | 40 | 60 |
| Example 15 | 15 | 15 | 50 | 54 | 24 | 30 | 30 | 120 | 40 | 60 |
| Example 16 | 5 | 5 | 70 | 61 | 6 | 55 | 55 | 120 | 40 | 60 |

TABLE 3

| | 400 nm | | | 700 nm | | |
|---|---|---|---|---|---|---|
| | Transmittance | Reflectivity | Degree of polarization | Transmittance | Reflectivity | Degree of polarization |
| Example 1 | ○ | ○ | ○ | ○ | ○ | ○ |
| Example 2 | ○ | ○ | ○ | ○ | ○ | ○ |
| Example 3 | ○ | ○ | ○ | ○ | ○ | ○ |
| Example 4 | ○ | ○ | ○ | ○ | ○ | ○ |
| Example 5 | ○ | ○ | ○ | ○ | ○ | ○ |
| Example 6 | ○ | ○ | ○ | ○ | ○ | ○ |
| Example 7 | ○ | ○ | ○ | ○ | ○ | ○ |
| Example 8 | ○ | ○ | ○ | ○ | ○ | ○ |
| Example 9 | — | — | — | — | — | — |
| Example 10 | x | ○ | ○ | x | ○ | ○ |
| Example 11 | x | ○ | ○ | x | ○ | ○ |
| Example 12 | — | — | — | — | — | — |
| Example 13 | x | ○ | x | x | ○ | ○ |
| Example 14 | x | ○ | x | x | ○ | ○ |
| Example 15 | x | x | x | ○ | x | x |
| Example 16 | x | ○ | ○ | ○ | ○ | ○ |

In Examples 1 to 8, since no aluminum was vapor-deposited on the first side face and the second side face of each ridge, the wire grid polarizer showed a high degree of polarization, a high p-polarized light transmittance and a high s-polarized light reflectivity.

In Example 9, since aluminum was vapor-deposited on the first side face and the second side face of each ridge and they continued to a fine aluminum wire 30 formed on each bottom face, measurement of the above parameters were not possible.

In Example 10 and 11, since the height Hma1 of the underlayer was too high, the p-polarized light transmittance decreased.

In Example 12, since the height Hma' (Hma2) of fine metallic wires was too high, and thick aluminum was vapor-deposited on the first side face and the second side face of each ridge, evaluation was not possible.

Example 13 is an example corresponding to experimental examples (FIGS. 2 and 3) of Non-Patent Document 1, wherein no underlayer was formed and the first fine metallic wires and the second fine metallic wires were formed by a single vapor deposition, whereby each second fine metallic wire substantially covers a bottom face of each groove and the p-polarized light transmittance was decreased. Here, in Example 13 of Table 2, the value of Dma1 represents the width of a portion of each first fine metallic wire projecting outwardly from the first side face of each ridge 12, and the value of Dma2 represents the width of a portion of the second fine metallic wire projecting outwardly from the second side face 20 of the ridge 12.

In Example 14, since thin aluminum was vapor-deposited on the first side face and the second side face of each ridge, the p-polarized light transmittance was decreased.

In Example 15, since the height Hma1 of the underlayer was too high, the p-polarized light transmittance in the short wavelength side was decreased. Further, since the height of Hma2 was insufficient, the degree of polarization and the s-polarized light transmittance were decreased.

In Example 16, since the height of Hma2 was too high, the wavelength dispersion of the p-polarized light transmittance became large, and the p-polarized light transmittance in the short wavelength side was decreased.

Industrial Applicability

The wire grid polarizer of the present invention is useful as a polarizer for image display devices such as liquid crystal display devices, rear projection TVs or front projectors.

The entire disclosure of Japanese Patent Application No. 2008-100553 filed on Apr. 8, 2008 including specification, claims, drawings and summary is incorporated herein by reference in its entirety.

| EXPLANATION NUMERALS | |
| --- | --- |
| 10: | Wire grid polarizer |
| 12: | Ridge |
| 14: | Light-transmitting substrate |
| 16: | Top face |
| 18: | First side face |
| 20: | Second side face |
| 22: | Underlayer |
| 22a: | First underlayer |
| 22b: | Second underlayer |
| 24: | First fine metallic wire |
| 26: | Groove |
| 28: | Bottom face |
| 30: | Second fine metallic wire |
| 32: | First projecting portion |
| 34: | Second projecting portion |

What is claimed is:

1. A process for producing a wire grid polarizer comprising a light-transmitting substrate having a surface on which a plurality of ridges are formed in parallel with one another at a predetermined pitch Pp; an underlayer having a first portion and a second portion, the underlayer covering a top face of each ridge of the substrate and upper end portions of a first side face and a second side face extending in a longitudinal direction of the ridge; a first fine metallic wire made of a metal or a metal compound and formed on a top face of the underlayer; and a second fine metallic wire made of a metal or a metal compound and formed on a bottom face of each groove between the ridges;

the process comprising forming the underlayer, the first fine metallic wire and the second fine metallic wire by a vapor deposition method satisfying the following conditions (A) to (F):

(A) the first portion of the underlayer is formed by vapor-depositing the under layer material at least once on the top face and the first side face of each ridge, without being deposited on the second side face of each ridge, from a direction substantially perpendicular to the longitudinal direction of the ridge and at an angle of $\theta^L$ on the first side face side to a height direction of the ridge;

(B) the second portion of the underlayer is formed by vapor-depositing the underlayer material at least once on a top face of the first portion of the underlayer formed under the above condition (A) and on the second side face of each ridge, without being deposited on the first side face of each ridge, from a direction substantially perpendicular to the longitudinal direction of the ridge and at an angle of $\theta^R$ on the second side face side to the height direction of the ridge;

(C) the angle $\theta^L$ in the vapor deposition under the above condition (A) satisfies the following formula (I) and the angle $\theta^R$ in the vapor deposition under the above condition (B) satisfies the following formula (II):

$$60° \leq \theta^L < 90° \quad \text{(I), and}$$

$$60° \leq \theta^R < 90° \quad \text{(II);}$$

(D) the height Hma1 of the underlayer formed by the vapor deposition under the above condition (A) and the vapor deposition under the above condition (B), satisfies the following formula (III):

$$1\ nm \leq Hma1 \leq 20\ nm \quad \text{(III)}$$

(E) after the vapor deposition under the above condition (A) and the vapor deposition under the above condition (B) are carried out, a metal or a metal compound is vapor-deposited on the top face of the underlayer and the bottom face of each groove between the ridges;

(F) the height Hma2 of the first fine metallic wire formed by the vapor deposition under the above condition (E) and the height Hp of the ridge satisfy the following formula (IV):

$$40\ nm \leq Hma2 \leq 0.9 \times Hp \quad \text{(IV).}$$

2. The process for producing a wire grid polarizer according to claim 1, wherein the pitch Pp of the ridges is at most 300 nm.

3. The process for producing a wire grid polarizer according to claim 1, wherein the ratio (Dp/Pp) of the width Dp of the ridge to Pp is from 0.1 to 0.6.

4. The process for producing a wire grid polarizer according to claim 1, wherein Hp is from 30 to 500 nm.

5. The process for producing a wire grid polarizer according to claim 1, wherein the width Dmb of the second fine metallic wire and the width (Pp−Dp) of the groove between the ridges satisfy the following formula (1-1):

$$0.45 \times (Pp-Dp) \leq Dmb \leq 0.95 \times (Pp-Dp) \quad (1\text{-}1);$$

wherein Dp is the width of the ridges.

6. The process for producing a wire grid polarizer according to claim 1, wherein the height Hmb of the second fine metallic wire and Hp satisfy the following formula (2-1):

$$40 \text{ nm} < Hmb < Hp \quad (2\text{-}1).$$

7. The process for producing a wire grid polarizer according to claim 1, wherein the width Dma1 of a portion of the underlayer projecting outwardly from the first side face of the ridge and the width Dma2 of a portion of the underlayer projecting outwardly from the second side face of the ridge, are each from 5 nm to 20 nm.

8. The process for producing a wire grid polarizer according to claim 1, wherein the underlayer material is a metal, a metal compound or a metal oxide.

9. The process for producing a wire grid polarizer according to claim 1, wherein the first fine metallic wire and the second fine metallic wire are made of silver, aluminum, chromium or magnesium.

10. The process for producing a wire grid polarizer according to claim 1, wherein the first fine metallic wire and the second fine metallic wire are not continuous with each other.

11. The process for producing a wire grid polarizer according to claim 1, wherein the first fine metallic wire and the second fine metallic wire are not continuous.

* * * * *